(12) United States Patent
Maguire

(10) Patent No.: US 8,104,997 B2
(45) Date of Patent: Jan. 31, 2012

(54) BULK RESIN UNLOADING APPARATUS AND METHOD

(76) Inventor: Stephen B. Maguire, Glenn Mills, PA (US)

( * ) Notice: Subject to any disclaimer, the term of this patent is extended or adjusted under 35 U.S.C. 154(b) by 305 days.

(21) Appl. No.: 12/102,454

(22) Filed: Apr. 14, 2008

(65) Prior Publication Data

US 2009/0257832 A1    Oct. 15, 2009

(51) Int. Cl.
*B65G 53/46* (2006.01)
(52) U.S. Cl. ......... 406/128; 406/141; 406/135; 406/113
(58) Field of Classification Search ............ 406/32–135, 406/152
See application file for complete search history.

(56) References Cited

U.S. PATENT DOCUMENTS

| | | | |
|---|---|---|---|
| 1,407,510 A * | 2/1922 | Bentham | 406/115 |
| 2,587,714 A * | 3/1952 | Embree et al. | 406/114 |
| 2,774,636 A * | 12/1956 | Whitlock | 406/15 |
| 2,905,347 A * | 9/1959 | Hopfeld | 414/622 |
| 3,951,462 A * | 4/1976 | De Francisci | 406/114 |
| 4,029,364 A * | 6/1977 | Salzer | 406/115 |
| 4,973,203 A | 11/1990 | Oftedal | |
| 5,379,814 A | 1/1995 | Posly | |
| 5,382,117 A * | 1/1995 | Rings et al. | 406/39 |
| 5,388,953 A | 2/1995 | Habicht | |
| 5,489,182 A | 2/1996 | Habicht | |
| 6,024,482 A | 2/2000 | Heyraud | |
| 6,036,408 A | 3/2000 | Wilhelm et al. | |
| 6,135,676 A * | 10/2000 | Anderson | 406/38 |
| 6,409,274 B1 | 6/2002 | Merrett | |
| 6,830,421 B1 | 12/2004 | Broderick | |
| 7,591,709 B2 * | 9/2009 | Shimizu et al. | 451/8 |

FOREIGN PATENT DOCUMENTS

| | | | |
|---|---|---|---|
| DE | 3238245 | | 4/1984 |
| DE | 19506538 A1 | * | 8/1996 |
| DE | 19712177 A1 | * | 9/1998 |
| EP | 371436 A1 | * | 6/1990 |
| EP | 1199266 B1 | | 5/2004 |

(Continued)

OTHER PUBLICATIONS

Brochure for OKTOMAT by Helios, undated; Web pages from Helios Systems, Inc. where brochure was found. Web page copyrighted 2006.
Brochure for Premier Ground Entry Gaylor Tilter Model 10-8500 from Ensign Equipment, Inc. dated Jul. 2009.
Brochure for Pneumatic Gaylor Tilter Model 10-5000 from Ensign Equipment, Inc. dated Jul. 2009.

(Continued)

*Primary Examiner* — Gene Crawford
*Assistant Examiner* — William R Harp
(74) *Attorney, Agent, or Firm* — Charles N. Quinn, Esq.; Fox Rothschild LLP

(57) ABSTRACT

The present invention relates to a vacuum loader assembly wherein the assembly is comprised of a frame, a first and second tube, a flexible tube, a motor, and a sweeper assembly. The frame is adapted to be positioned over an opening of the container. The first tube is mounted to the frame and is in fluid communication with a vacuum source. The second tube is rotatably mounted to the first tube and is also in fluid communication with the first tube and the sweeper assembly is mounted to the second tube. The flexible tube extends from the second tube such that, when the frame of the present invention is placed over a container, the second tube, flexible tube, and sweeper assembly are lowered into the container and rotated by the motor such that, when the vacuum source is activated, the flexible tube suctions out the contents of the container.

4 Claims, 9 Drawing Sheets

FOREIGN PATENT DOCUMENTS

| | | |
|---|---|---|
| EP | 1580133 A2 | 9/2005 |
| SU | 1008122 | 3/1983 |

OTHER PUBLICATIONS

Brochure for Gaylord Tilters 299 and 120 Series from The Conair Group, Inc., brochure is undated; Web page from The Conair Group, Inc. where brochure was found. Web page copyrighted 2000-2009.

Gaylord Tilter brochure from Mac Automation Concepts, Inc., brochure is undated; Web page from Mac Automation Concepts, Inc. where brochure was found. Web page copyrighted 2009.

Brochure for Air Operated Floor Level Gaylord Tilters from IMS Company, dated 2005.

Brochure for Hydraulic Gaylord Dumper from IMS Company, dated 2005.

\* cited by examiner

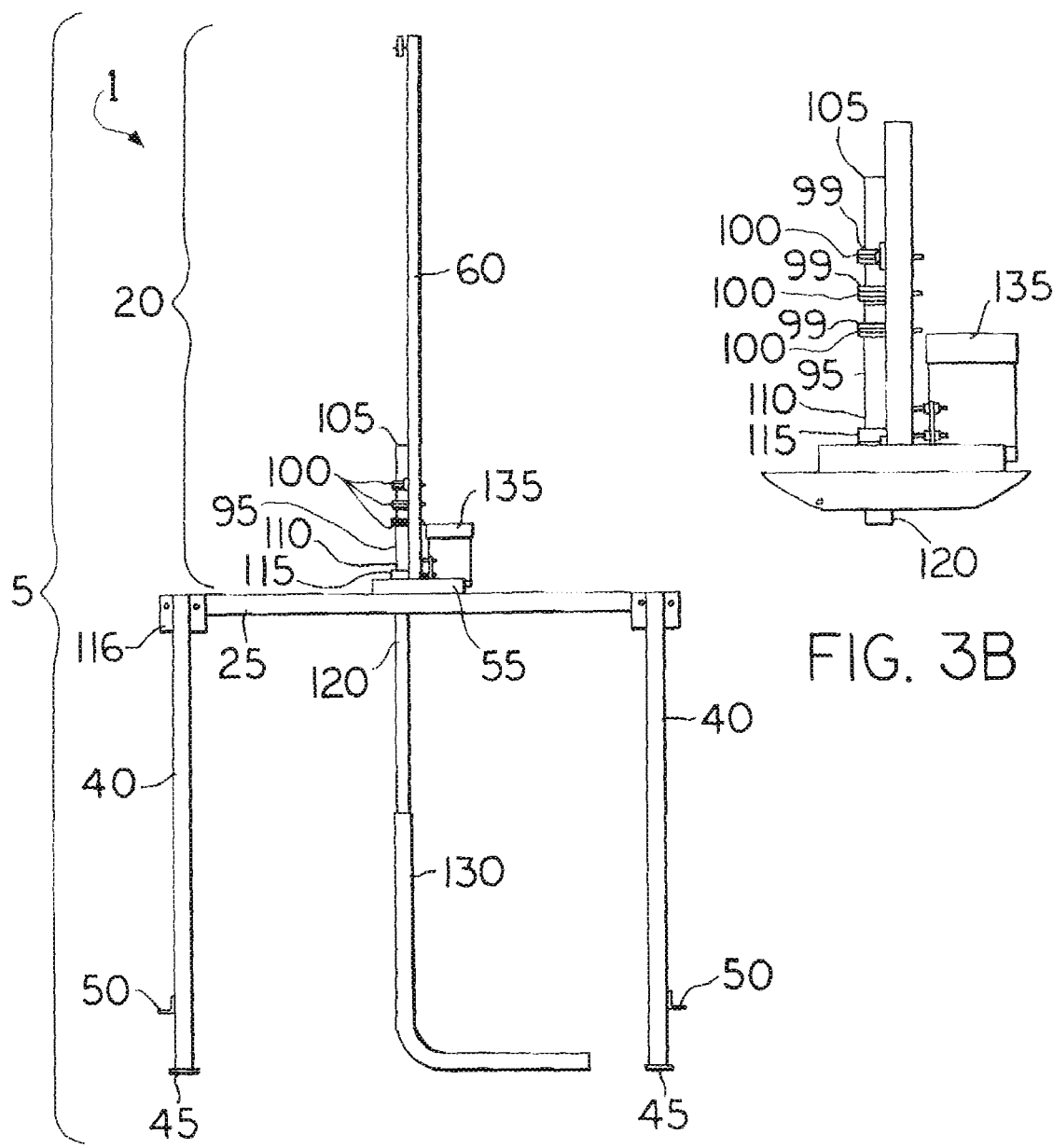

BULK RESIN UNLOADING APPARATUS AND METHOD

FILED OF THE INVENTION

The present invention relates to an apparatus and method for unloading the contents of a container. More specifically, the present invention relates to an apparatus which utilizes the suction force created from a vacuum pump to remove substantially all of the particulate material or bulk resin stored within a container without an operator's intervention.

BACKGROUND OF THE INVENTION

In many manufacturing operations, particularly with respect to plastic fabrication, it is not uncommon for some of the materials that are employed in the operation to be shipped to the manufacturing facility in heavy containers, e.g. drums, barrels, gaylords, bulk truck, rail cars, silo, day bins, flat bottom bins, or other utility bins which may or may not have a sloped bottom or flat bottom. Drums are typically fiber drums that are typically cylindrical, but can be other shapes as well, and usually hold between 200 to 250 lbs of material. Barrels can be the traditional barrels such as those made with staves of wood or other suitable material including metal and plastic. Gaylords are typically cubic corrugated containers, usually with a 1000 pound weight limit and are often made of cardboard material, however, they are not limited to this material and may be comprised of plastic as well.

Any of these containers may be delivered by any number of means to the manufacturing facility and are stored until they are required for use in the manufacturing process. The containers can be stored anywhere on the manufacturing site as desired and can be transported from the storage location by any suitable means such as by a fork lift, a conveyor belt, etc. Once the contents of the container are needed, the forklift or other device will remove the container from the storage site and transport it to the location where it is needed. There, the container is either emptied all at once or only portions are removed from time to time on an as needed basis. However, usually these containers are too heavy to be lifted by a person and a mechanical means is necessary to remove the contents.

For some particulate material or bulk resin contained in the container, such as plastic pellets or powders and the like, a vacuum system or similar conveyance means can be used to remove the material from the container and transport it through piping or tubing, or other similar means often used in conveying lines, to wherever it is needed for manufacturing purposes. It is typical to use a vacuum loader to empty these containers. A vacuum loader is comprised of, at least, a lance or wand which is directly or indirectly coupled to a vacuum source. The lance or wand is placed in the container and is either manually forced to the bottom by an operator or placed on top of the contents of the container and allowed to suction its way to the bottom. However, the wand or lance is relatively stationary. Thus, it only has the option of suctioning the contents of the container that are immediately around the wand or lance. To this end, without operator assistance to reposition the lance or wand, the vacuum loader is inefficient to remove all of the particulate material and may leave as much as half the contents within the container. Accordingly, an employee must constantly monitor the wand and manually adjust it to ensure all of the material is removed from the container. This is very costly in terms of labor and lost production.

One possible solution to this problem is addressed in European Patent No. EP 1 199 266, disclosing a device and method for evacuating bulk material. Specifically, EP 1 199 266 teaches a suction apparatus that may be lowered into a sack or sack-like container. The suction apparatus, once inserted into the sack, rests on top of the bulk resin contained therein and sinks as the resin is evacuated. The container is coupled to a lifting apparatus wherein the lifting apparatus is adapted to raise and lower the sack along the vertical axis. As the sack is raised, the diameter of the sack is reduced, thereby, forcing the resin toward the center of the container and facilitating the ability of the suction apparatus to reach substantially all of the resin. In this configuration, however, the container must be one that is easily manipulated. In other words, it is limited to a sack or sack-like container and does not provide a solution for evacuating resin from more rigid container types, e.g. drums, barrels, gaylords, bulk truck, rail cars, silo, day bins, flat bottom bins, or other utility bins.

Thus, there remains a need in the art for an apparatus and method for removing particulate material, e.g. plastic pellets, powder, and the like, from a relatively rigid storage container without requiring operator intervention or manipulation of the container. Moreover, there is a need in the art for a vacuum loader to improve the quantity of particulate matter removed from a container while reducing lost labor due to the inefficiencies of the equipment.

The present invention addresses the foregoing needs.

SUMMARY OF THE INVENTION

The present invention relates to a vacuum loader assembly and method of use for unloading the contents of a container. More specifically, the present invention utilizes the suction force created from a vacuum pump to remove particulate material or bulk resin stored within a container. The material may be comprised of plastic resin, plastic pellets, powder, and any other similar type of substance which is known to be stored in containers. The apparatus and method of the present invention is applicable to any type of storage or transport container known in the art such as, gaylords, drums, barrels, bulk trucks, rail cars, silo, day bins, flat bottom bins or other utility bins which may or may not have a sloped bottom or flat bottom; however, the apparatus of the present is preferably used on Gaylord style containers.

The vacuum loader assembly of the present invention is comprised of a frame, a first tube, a second tube and a flexible tube. More specifically, the frame of the present invention is comprised of a base platform comprised of a front rail, a rear rail and two side rails wherein the front rail and the rear rail are coupled to the side rails so as to form a substantially rectangular platform with an opening passing therethrough. The platform is held above the ground by a plurality of legs wherein each leg extends from a corner of the rectangular platform. In one embodiment, the legs may be coupled together by a stabilizing bar.

Extending upward from the base is an extension assembly. The extension assembly extends vertically from the platform and is comprised of at least two (2) vertical risers each adjoined at one end to a horizontal rail. The other end of the vertical risers are coupled to the base such that the extension assembly straddles the opening therethrough.

A plate is slidingly mounted to the extension assembly such that the plate is perpendicular to the base and may slide along the longitudinal axis of the extension assembly. A first tube is coupled to the plate such that the first tube is also adapted to slide along the vertical risers of the extension assembly in unison with the plate. The first tube is in fluid communication with a vacuum source and also extends proximal to the opening of the base, when the plate is in its lowermost position.

The second tube is rotatably mounted to and in fluid communication with the first tube. The second tube extends from the first tube through the opening of the base. To this end, the longitudinal axis of the second tube is parallel with the first tube, parallel with the longitudinal axis of the extension assembly, and perpendicular to the base. At an end of the second tube which is distal to the junction with the first tube, the second tube may be angled. Specifically, in this embodiment, the angled end of the second tube is elbowed approximately 90 degrees such that this end of the tube is perpendicular to the longitudinal axis of the second tube.

The flexible tube is coupled to the second tube such that the flexible tube is in fluid communication with the second tube. More specifically, the flexible tube is also coupled to the second tube such that the flexible tube is concentric with the end of the second tube which is distal to the junction with the first tube. In an embodiment of the invention where this end of the second tube is not angled, the flexible tube is simply concentric and coupled to the second tube. In an embodiment of the invention wherein the end of the second tube is angled, the flexible tube is adapted to fit over the angled portion and extend horizontally from the second tube such that the flexible tube is perpendicular to the longitudinal axis of the first tube. The flexible tube is sized to extend from the elbowed end of the second tube so as to reach each side and corner of the targeted container from which the resin will be removed.

A motor is coupled to the plate and is adapted to slide with the plate along the longitudinal axis of the extension assembly. The motor also engages the second tube, preferably by a pulley assembly, so as to cause the second tube to rotate in one direction at least 360 degrees, but, preferably, the second tube is adapted to rotate continuously either clockwise or counterclockwise without rotational limitations. To this end, the motor facilitates the rotational movement of both the second tube and the attached flexible tube.

In a further embodiment, a sweeper assembly is coupled to either the second tube or the flexible tube, preferably, to the second tube. More specifically, the sweeper assembly is comprised of a sweeping element and a coupling element. The coupling element is adapted to secure the sweeper assembly to the second tube or flexible tube such that the sweeping element may extend therefrom in a plane substantially perpendicular to the second tube. In this configuration, the sweeper assembly directs particulate material from the center of the container toward the periphery of the container as the second tube and flexible tube rotate. To this end, the sweeper assembly may be comprised of any solid material forming a blade-like or angled apparatus known in the art for moving particulate matter from one position to another. In one embodiment, the sweeper assembly may be angled so as to channel particulate matter in the center to the periphery of the container.

In operation, the vacuum loader assembly of the present invention is placed on a, preferably, flat surface. The plate is lifted along the vertical risers of the extension assembly such that the plate is proximal to the horizontal rail. The container may be positioned beneath the base. Once the container is in position, the plate is lowered such that the flexible tube and the second tube are lowered into an interior of the container at least until contacting the contents of the container. An operator then activates the motor and the vacuum source. Alternatively, and preferably, the vacuum created by the activation of the vacuum source closes a switch activating the motor. The motor causes the second tube and the flexible tube to continuously rotate in one direction. While rotating, the vacuum source creates a suction force exerted through the flexible tube, by way of the first and second tubes. To this extent, the flexible tube suctions and removes the material resin within the container as it rotates. Moreover, as the flexible tube rotates, the sweeper assembly urges the particulate matter toward the periphery of the container. Because of the length of the flexible tube, the flexible tube is able to suction the material at the periphery and, therefore, remove substantially all of the particulate material from the container.

BRIEF DESCRIPTION OF THE FIGURES

FIG. 3A illustrates a front view of the vacuum loader assembly of the present invention.

FIG. 3B illustrates an enlarged front view of the vacuum loader assembly coupling a first tube to the frame and of the motor assembly.

DETAILED DESCRIPTION OF THE INVENTION

The present invention relates to an apparatus and method for unloading the contents of a container. More specifically, the present invention utilizes the suction force created from a vacuum pump to remove particulate material or bulk resin stored within a container. The material may be comprised of plastic resin, plastic pellets, powder, and any other similar type of substance, which is known to be stored in containers. The apparatus and method of the present invention is applicable to any type of storage or transport container known in the art such as, gaylords, drums, barrels, bulk trucks, rail cars, silo, day bins, flat bottom bins or other utility bins which may or may not have a sloped bottom or flat bottom; however, the apparatus and method of the present invention is preferably used on Gaylord style containers.

Figure 1:
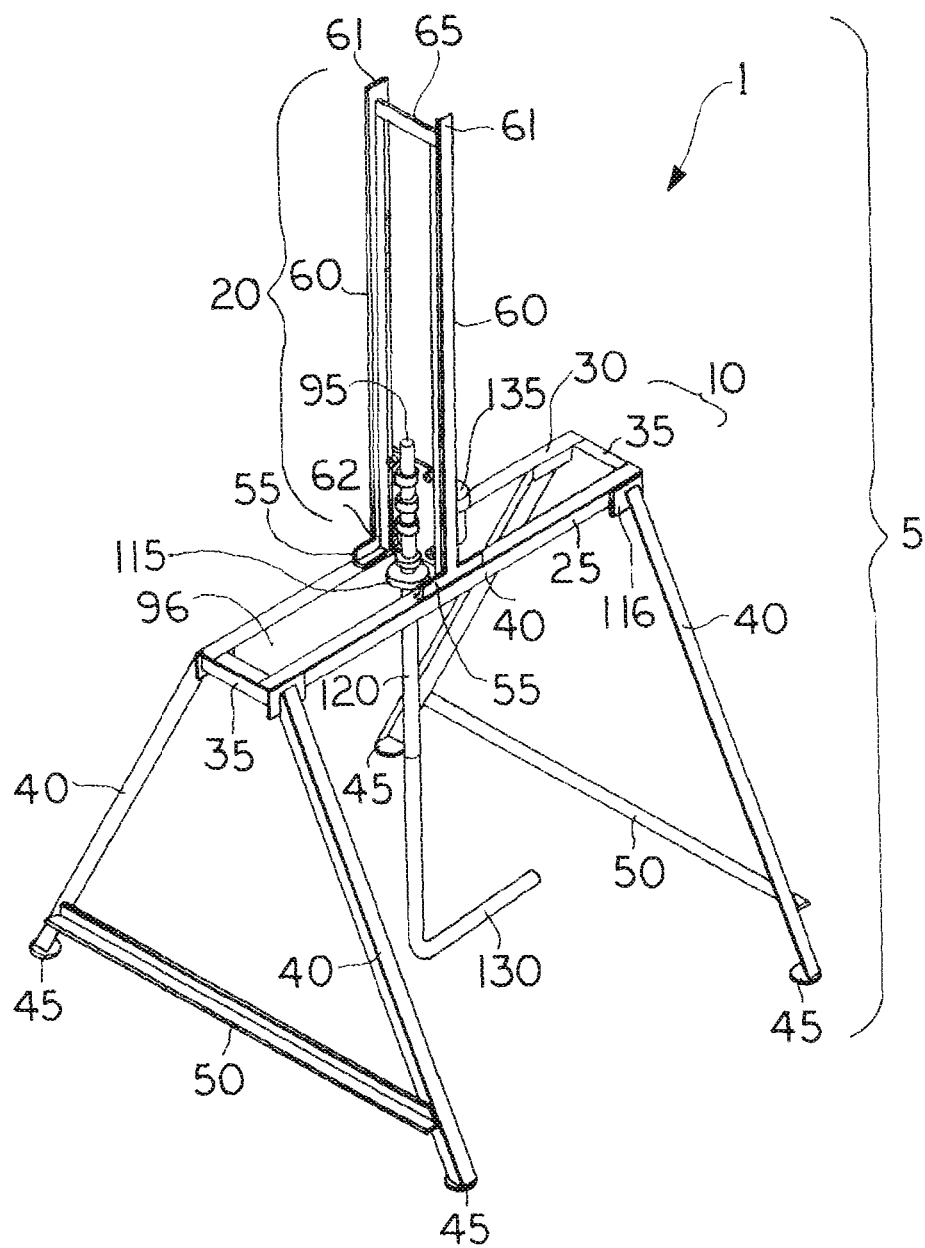
FIG. 1 illustrates the vacuum loader assembly of the present invention.

Referring to FIG. 1, the vacuum loader assembly 1 of the present invention is illustrated. At its core, the vacuum loader assembly 1 is comprised of a frame 5, a first tube 95, a second tube 120, a flexible tube 130, and a motor 135. The frame 5 is comprised of a base platform 10, a plurality of legs 40 thereunder, and a riser or extension assembly 20. More specifically, the base 10 may be comprised of a similarly sized front rail 25 and rear rail 30 and two similarly sized side rails 35 adjoined so as to form a rectangularly shaped platform. Preferably, the rails 25, 30, 35 are adjoined such that an opening 96, desirably rectangular, is formed through the center of the base 10.

The rails 25, 30, and 35 may be comprised of metal, plastic, wood, or the like and may be coupled to one another by any standard method understood in the art, e.g. bolts, glue, welding, etc. In one embodiment, the rails 25, 30, 35 are comprised of angle iron and are either welded together or bolted together so as to form a flush and flat upper surface of the base 10. Although not limited to this embodiment, it is desirable that the base 10 be sized such that it can extend across the entire width of a targeted container. In other words, if the container is a Gaylord, drum, barrel, or any similar container type such as those discussed above, then the width top platform 10, as determined by the front rail 25 and the rear rail 30, should extend across the width of the Gaylord, drum, barrel, etc. The platform 10, however, is not limited to the above structure or shape and may be comprised of any similar structure, shape or material capable of supporting the vacuum loader 1 and all of its components in accordance with the present invention discussed herein.

At both ends of the platform 10 are a plurality of legs 40. Preferably, the present invention is comprised of four (4) legs 40 wherein each leg individually extends from the junction of the front rail 25 and one of the side rails 35 or from the junction of the rear rail 30 and one of the side rails such that at least one leg 40 extends from all four corners of the base 10. To this end, the present invention is comprised of two sets of legs 40, one at each end of the platform 10. The legs 40 may be comprised of metal, plastic, wood, or the like and may be coupled to the corners of the top platform 10 by any standard method understood in the art, e.g. bolts, glue, welding, etc. In one embodiment, the legs are coupled to the corners by way of a base mounting pad 116 wherein the base mounting pad 116 may secured to the platform 10 by welding, bolts, glue, or the like. The mounting pad 116 may be machined on the leg or coupled to the leg by any of the attachment mechanisms discussed herein. In a further embodiment, the legs 40 of the present invention are comprised of angle iron and are bolted to the corners of the platform 10 by way of the base mounting pad 116.

Figures 2A, 2B:
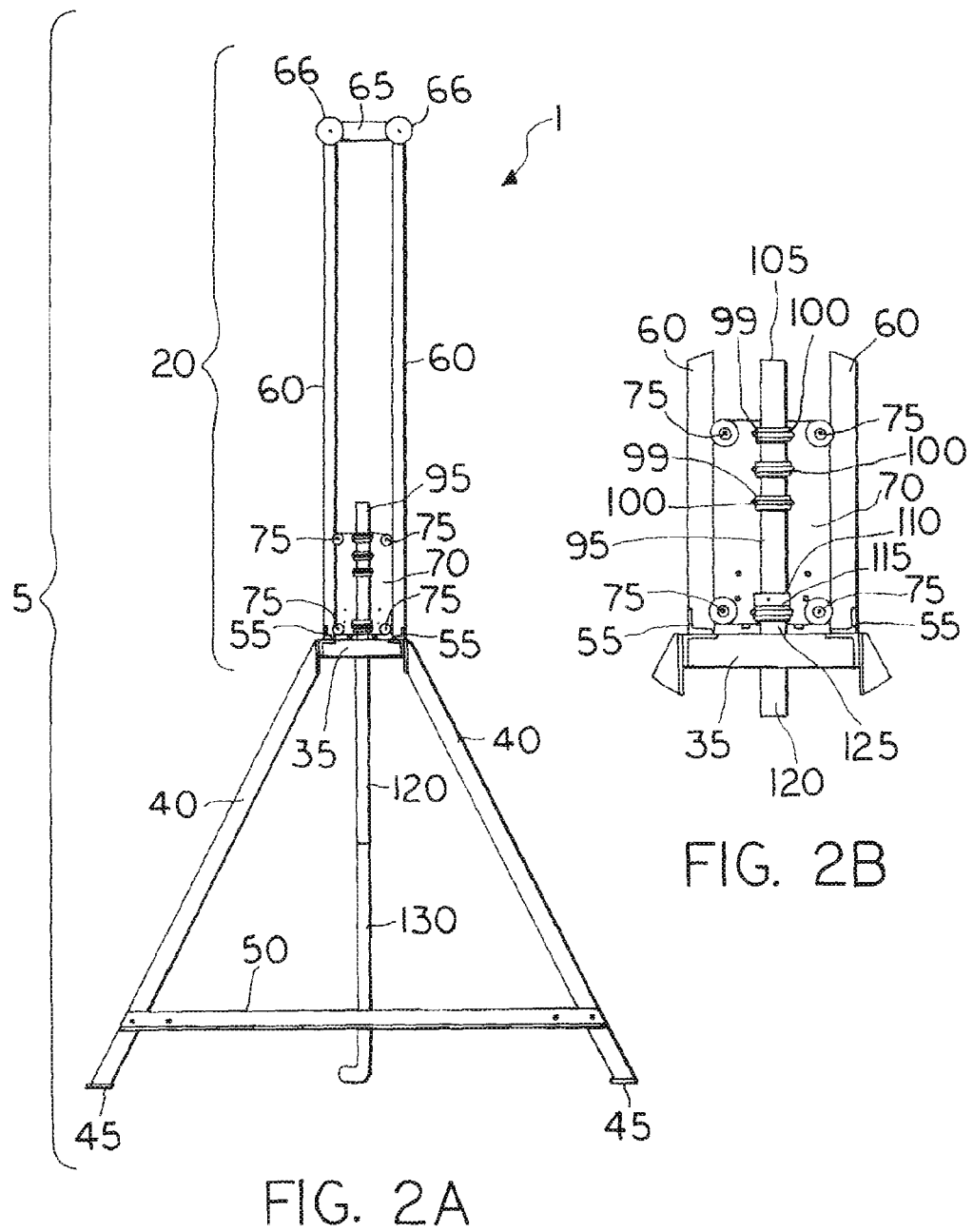
FIG. 2A illustrates a side view of the vacuum loader assembly of the present invention.
FIG. 2B illustrates and enlarged side view of the vacuum loader assembly coupling the first tube to the frame of the present invention and coupling the second tube to the first tube.

In each of the above embodiments, the legs 40 may extend perpendicularly from the base, but, preferably, extend at approximately at 45 degree angle from the base 10. More specifically, as illustrated in FIGS. 1 and 2A, the legs 40 may extend from the base 10 at an outward angle so as to provide additional support for the platform 10. In each of the foregoing embodiments, it is also desirable that the legs 40 be sized such that they are longer than the sides or height of the targeted container. For example, if the container is a Gaylord, drum, barrel, or any of the above containers types then the legs extend from the ground such that the base 10 may extend across the top and the width of the container. To this end, based on the width of the frame and height of the legs, the frame 5 is adapted to straddle the targeted container.

At an end of each leg 40 is a foot 45 and, optionally, a foot pad (not illustrated). Each foot 45 is coupled to an end of each of each leg 40 that is distal to the junction of the leg 40 and top platform 10. Each foot 45 and foot pad serves to prevent the frame 5 from sliding across the ground and to prevent the frame 5 from damaging surface on which it is placed.

Extending between each set of legs 40 at both ends of the frame 5 are at least one leg support or stabilizing bar 50. More specifically, the stabilizing bar(s) 50 couple two of the legs together so as to stabilize the frame 5 and restrict the movement of the legs, especially during operation of the vacuum loader. The stabilizing bars 50 extend parallel to one of the side rails 35 and couple together the two legs extending from each corner of each respective side rail 35. The stabilizing bars 50 may be comprised of metal, plastic, wood, or the like and may be coupled to the legs 40 at any point along the length of the legs by any standard method understood in the art, e.g. bolts, glue, welding, etc. For example, in one embodiment the stabilizing bars 50 of the present invention are comprised of angle iron wherein the stabilizing bars 50 are bolted to the legs 40 such that they are parallel to the side rail 35 of the platform 10. As illustrated in FIG. 3A, it is desirable that the stabilizing bars 50 not interfere with the ability of the frame 5 to straddle the container, while still stabilizing the legs 40 of the frame 5. To this end, the stabilizing bars 50 may be coupled to the legs on a side of the legs distal to the middle of the frame and may be proximal to the end of the legs 40 that are coupled to the foot pads 45.

Referring again to FIG. 1, extending perpendicularly to and up from the top platform is an extension assembly 20. More specifically, the extension assembly 20 is comprised of two vertical risers 60 and a horizontal rail 65 supported by the front rail 25 and rear rail 30 of the base 10. To this end, the extension assembly 20 substantially straddles the opening 96 of the base 10. The vertical risers 60 and a horizontal rail 65 may be comprised of metal, plastic, wood, or the like and may be bolted, welded, glued, or affixed together by any other similar means known in the art. In one embodiment the risers 60 and rail 65 are comprised of angle iron wherein the rails are bolted together so as to form the structure disclosed herein. More specifically, a first end of 61 each vertical riser 60 is coupled to opposing ends of the horizontal rail 65 such that the resulting structure is substantially rectangular or squared.

Coupled to the second ends 62 of each vertical riser 60 are base mounting brackets 55 wherein each bracket is adapted to couple the extension assembly 20 to the base 10. Specifically, a one end of a first vertical riser is coupled to the front rail of the base by way of a bracket 55 and one end of a second vertical riser is coupled to the rear rail of the base, also by way of a bracket 55, such that the extension assembly straddles the opening of the base. The brackets 55 may be comprised of metal, plastic, wood or the like and may be coupled to the vertical rails 60 by way of welding, glue, bolts, or any other similar method understood in the art. The brackets 55 may, similarly, couple the vertical rails 60 to the base 10 by way of welding, glue, bolts, or any other similar method understood in the art.

In an alternative embodiment, the brackets 55 may slidingly engage the base. To this end, the brackets 55 may couple the extension assembly 20 to the base 10 such that it can slide along a horizontal axis of the platform in a direction that is parallel to the front rail 25 and the rear rail 30 and perpendicular to the side rails 35. The mechanism for the sliding engagement may be any such mechanism understood in the art such as, but not limited to, a track/wheel assembly, a ball bearing assembly, a pulley assembly or the like.

Figure 5:
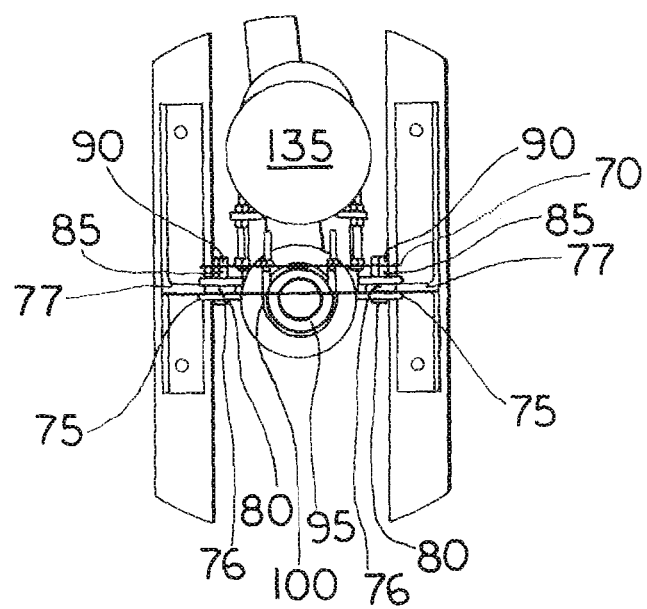
FIG. 5 illustrates an enlarged top view of the motor, plate, and extension assembly.

Referring to FIGS. 2A and 2B, parallel to and in a sliding engagement with the vertical risers 60 is a motor mounting plate 70. The motor mounting plate 70 may be comprised of metal, plastic, wood, etc. and is the approximate width of the distance between the two vertical risers 60. Referring to FIGS. 2B and 5, the plate 70 is slidingly engaged with the extension assembly 20. To this end, in one non-limiting embodiment, the plate 70 may be coupled to a plurality of grooved wheels 75 wherein the grooves 76 of the wheels 75 are adapted to overlap and engage with corresponding tracks 77 on the vertical risers 60. As such, the plate 70 is adapted to slide up and down the vertical risers 60 of the extension assembly 20, utilizing the wheel/track assembly, wherein the horizontal rail 65 presents the upper limit of the plate's movement and the base/extension assembly junction presents the plate's lower limit of movement. As illustrated in FIG. 5, the plate may be secured to the wheels 75 by a bolt 80, locknut 85, and nut 90 such that the plate is secured to the bolt 80 without interfering with the action of the wheels 75 along the vertical risers 60. The present invention, however, is not limited to this embodiment and the wheels, or similar mechanism, may be secured to the plate 70 by any similar attachment means.

In one embodiment the plate 70 may be raised and lower along the extension assembly 20 by way of a pulley system. For example, referring to FIG. 2A, one or more pulley wheels 66 may be secured to the extension assembly 20, preferably, along the horizontal rail 65. The pulley wheels 66 engage the plate 70 by way of a rope, wire, or the like such that the action of the rope/wire/etc. passing along the pulley wheels 66 functions to raise and lower the plate 70 along the extension assembly 20 between the plate's uppermost and lowermost positions. To this end, the pulley system may be adapted to lock the plate in a specific position. Alternatively, the pulley system may be adapted to raise or lower the level of the plate depending upon the level of resin within the targeted container and/or the desired position of the tubes of the vacuum loader. The present invention, however, is not limited to the above pulley system. Rather, any similar mechanism, whether manual or automatic, may be utilized to facilitate the raising and lowering of the plate 70 along the extension assembly 20.

In a further embodiment, either independently or in conjunction with the above pulley system, a counterforce may be applied to the plate. More specifically, in one embodiment a spring loaded cable may be secured to the plate and the frame, preferably by way of the extension assembly, such that the spring loaded cable provides a lift force slightly lower than the weight associated with the plate. Moreover, the spring loaded cable provides a lift force adapted to compensate for the weight of the plate, motor, and plurality of tubes affixed thereto such that the net downward force of the weight of the these items is substantially reduced, thus, less force is exerted on the resin, as discussed further herein. The application of the counterforce is not limited to a spring loaded cable but may be in a constant force spring, a counterweight system, or the like.

Coupled to one side of the plate 70 is a first tube 95. The first tube 95 is a hollow cylindrical tube comprised of metal, plastic, etc. To this end, it is desirable that the first tube 95 be comprised of aluminum, however, the present invention is not limited to this embodiment. Regardless of its composition, the first tube 95 is coupled to the plate 70 such that it is adapted to slide up and down the vertical risers 60 of the extension assembly 20 in conjunction with the plate 70. As illustrated in FIGS. 3B and 5, the first tube 95 may be secured to the plate 70 by a plurality of U-bolts 100 and nuts spaced along the longitudinal axis of the plate 70 and centered thereon. In a non-limiting embodiment, the U-bolts 100 may correspond with a plurality of grooves (not illustrated) within the first tube 95 such that, when secured to the plate 70, the U-bolts 100 rigidly hold the first tube 95 in position against the plate 70. Alternatively, a plurality of annular bushings 99 may be spaced between the U-bolts 100 and the first tube 95 wherein the bushings 99 reduce frictional damage or wear by the U-bolts 100 on the first tube 95, while still allowing the U-bolts 100 to frictionally hold the first tube 95 to the plate. The present invention, however, is not limited to these embodiments, and the first tube 95 may be coupled to the plate by any similar mechanism understood in the art.

Figure 8A:
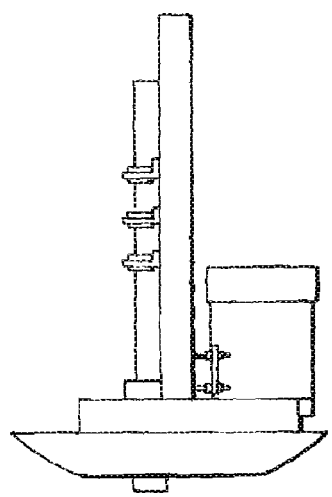
FIG. 8A illustrates an enlarged front view of an alternative embodiment of the coupling mechanism for coupling the first tube to the frame of the vacuum loader assembly.
Figure 8B:
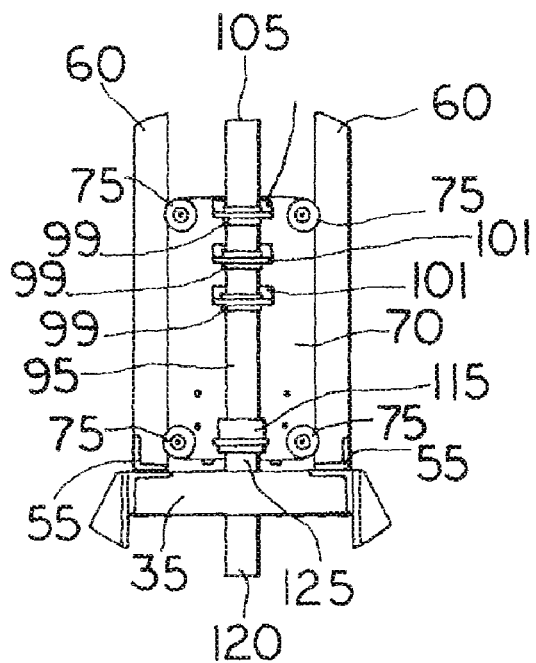
FIG. 8B illustrates and enlarged side view of an alternative embodiment of the coupling mechanism for coupling the first tube to the frame of the vacuum loader assembly.
Figure 8C:
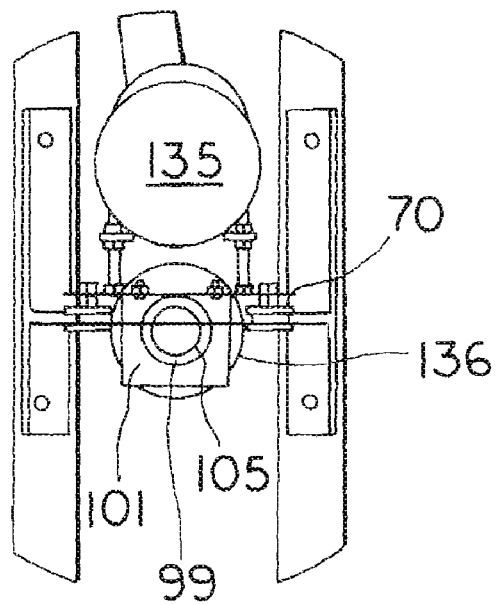
FIG. 8C illustrates an enlarged top view of an alternative embodiment of the coupling mechanism for coupling the first tube to the frame of the vacuum loader assembly.

For example, referring to FIGS. 8A, 8B, and 8C, in an alternative embodiment, rather than U-bolts, the first tube 95 may be secured to the plate 70 by one or more brackets. In one embodiment, the bracket is an L-bracket 101 comprised of steel, or other similar material. One side of the L-bracket may contain a hole passing therethrough wherein the hole is size to fit the first tube 95 and, optionally, a bushing 99. To this end, the first tube 95 and bushing 99 may be inserted into the hole of the L-bracket 101 such that the L-bracket 101 and bushing 99 secure the first tube therein. As illustrated in FIG. 8C, the side of the L-bracket 101 without the hole may be coupled to the plate 70. In a preferred embodiment, the L-bracket is secured to the plate by one or more nuts and bolts, however, the present invention is not limited to this embodiment and may be secured by any method known in the art to couple a metal bracket to a metal plate. Based on the foregoing, and as illustrated in FIGS. 8A, 8B, and 8C, a plurality of brackets may be secured along the longitudinal axis of the first tube 95.

Figure 11A:
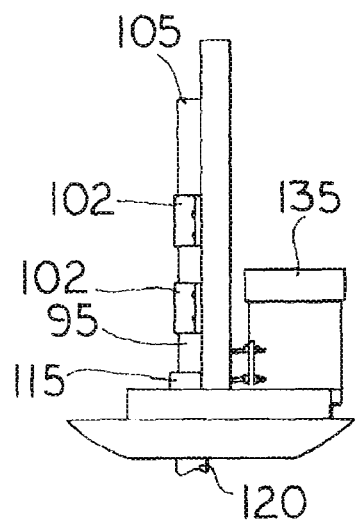
FIG. 11A illustrates an enlarged front view of a fourth embodiment of the coupling mechanism for coupling the first tube to the frame of the vacuum loader assembly.
Figure 11B:
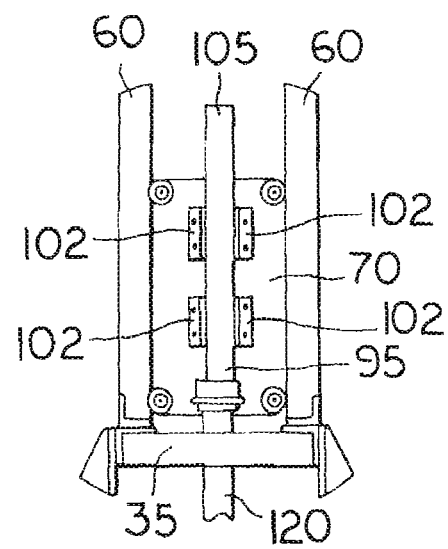
FIG. 11B illustrates an enlarged side view of a fourth embodiments of the coupling mechanism for coupling the first tube to the frame of the vacuum loader assembly.

In an alternative embodiment, referring to FIGS. 11A and 11B, the L-brackets may be completely solid and coupled to the sides of the first tube 95. Specifically, as illustrated in FIG. 11B, two solid L-brackets 102 may be secured to opposing sides of the first tube 95 wherein each L-bracket 102 is coupled to its respective side of the first tube 95 and to the plate 70. In a preferred embodiment, each L-bracket 102 may be welded, i.e. spot welded, to the side of the first tube and secured to the plate by a plurality of nuts and bolts. The present invention is not limited to these methods and, in accordance with the above, any method of securing a metal L-bracket to a metal tube and metal plate may be utilized.

Figure 9A:
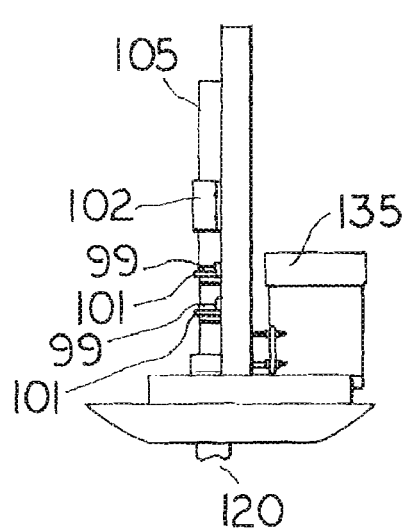
FIG. 9A illustrates an enlarged front view of a third embodiment of the coupling mechanism for coupling the first tube to the frame of the vacuum loader assembly.
Figure 9B:
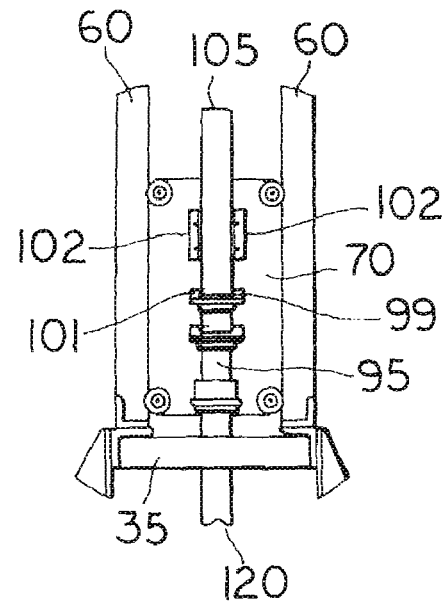
FIG. 9B illustrates an enlarged side view of a third embodiment of the coupling mechanism for coupling the first tube to the frame of the vacuum loader assembly.

The present invention is also not limited to the foregoing methods of coupling the first tube 95 to the plate 70 and may be further comprised of any combination of the foregoing methods, or similar methods, of securing the first tube 95 to the plate 70. In the most preferred embodiment, as illustrated in FIGS. 9A and 9B, the first tube 95 may be secured to the plate 70 using both types of L-brackets 101, 102. Specifically, the uppermost L-bracket 101 may be comprised of a set of solid L-brackets 102 secured to opposing sides of the first tube 95 wherein each L-bracket 102 is spot welded to the first tube 95 and coupled to the plate 70 by way of a plurality of nuts and bolts. Beneath the set of solid L-brackets 102 and substantially centered on the plate 70 is a first L-bracket 101 with a hole passing therethrough. In accordance with the foregoing, the first L-bracket 101 and bushing 99 may be secured to the first tube 95 and to the plate 70 so as to provide a second means of securing the first tube 95 to the plate 70. Finally, beneath the first L-bracket 101 with a hole is a second L-bracket 101 with a hole passing therethrough. Much like the first L-bracket 101 and bushing 99, the second L-bracket 101 and bushing 99 are secured to the first tube 95 and to the plate 70 in accordance with the above, so as to provide a third means for securing the first tube 95 to the plate 70. This most preferred embodiment, however, is not intended to be limited to the structure of the present invention and the invention may also include any of the foregoing coupling means, or similar coupling means, in any number or size so as to secure the first tube to the plate.

In any of the above embodiments, and referring to FIGS. 3A and 3B, the first tube 95 may be secured to the plate 70 such that it is approximately centered between the vertical risers 60 of the extension assembly 20. The first tube 95 is, thereby, vertically positioned and its longitudinal axis is perpendicular to that of the base 10. In one embodiment, a first end 105 of the first tube 95 extends above the plate 70, as illustrated in FIGS. 1 and 2A, and is adapted to receive a vacuum source (not illustrated). In one embodiment, the vacuum source is remote from the present invention and is removably coupled to the first end 105 of the first tube 95 by a vacuum receiver. The vacuum receiver may be a flexible tube (not illustrated) sized to fit over the first end 105 of the first tube 95 and may be adapted to be coupled thereto by a coupling mechanism. The flexible tube may be comprised of a synthetic polymer, plastic, or vinyl, although not limited thereto, and the coupling mechanism is a clamp, most preferably a screw clamp. However, the coupling mechanism is not limited to a clamp and the vacuum receiver may be coupled by way of a threading engagement, snap fit, a retention ring, bolts, or any similar mechanism known in the art such that the hollowed portion or cavity of the first tube 95 is placed into fluid communication with the vacuum source.

From the first end 105, the first tube extends downwardly substantially parallel to the plate 70 and proximal to the opening 96 of the base 10 to a second end 110. A retaining ring 115 is coupled to the second end 110 of the first tube 95. Specifically, the retaining ring is coupled to the second end 110 of the first tube 95 by way of a retaining pin, bolt, screw or the like. In a further embodiment, the retention ring 115 may also receive a U-bolt or bracket so as to further secure the first tube 95 to the plate 70.

The retention ring 115 is adapted to receive a second tube 120 so as to place the first tube 95 and the second tube 120 into fluid communication with each other. Similar to the first tube 95, the second tube 120 is a hollow cylindrical tube comprised of any standard material such as metal, plastic, etc. In one embodiment, the second tube 120 may be comprised of aluminum, however, the present invention is not limited to this embodiment. A first end 125 of the second tube 120 may be grooved (not illustrated) and adapted to be received by the retaining ring 115 on the first tube. A second end (not illustrated) of the second tube 120 may be straight or bent approximately 90 degrees relative to the longitudinal axis of the second tube 120 and is adapted to received a flexible tube, discussed below.

The first end 125 of second tube 120 is secured in a position adjacent to the first tube 95 by way of the retention ring 115 such that the second tube 120 is in fluid communication with the first tube 95 and is able to rotate about its longitudinal axis. Specifically, in one embodiment, the retention ring 115 may be removably engagable with the second tube 120 by way of a ball bearing assembly. As such, a plurality of ball bearings within an interior groove of the retention ring 115 may correspond with a groove, or the like, at the first end of the second tube 120. Based on the foregoing, the first tube 95 may be coupled to the plate 70 such that the first tube is relatively immovable, while the second tube 120 is rotatably mounted to the first tube such that the second tube may rotate at least 360 degrees about its longitudinal axis.

The retention ring provides an additional advantage in contributing to the vacuum flow within the first tube. Specifically, as noted above, the first and second tubes are held proximal to one another by way of the retention ring 115 such that they are adjacent to each other, but with a slight gap therebetween. To this end, when the vacuum source is in operation, air from an exterior side of the tube is allowed to flow into the gap between the first tube and the second tube and into the fluid stream created by the vacuum source. This additional air contributes to the overall fluid stream and facilitates the ability of the vacuum source to suction the resin from the container.

When secured to the retention ring 115, the second tube 120 extends vertically and downwardly from the base 10 toward an interior of the frame 5 such that the second end of the second tube 120 is substantially between all four legs 40 of the frame 5. To this end, when the frame is straddling the container, the second tube extends from the platform above the container down into an interior of the container. How far the second tube 120 extends into the container depends upon the location of the plate 70 on the vertical risers 60. For example, if the plate 70 is positioned on the vertical risers 60 in its uppermost position, i.e. near horizontal rail 65, then the second end of the second tube 120 would be proximal to the base 10 and the top of the container thereunder. Conversely, if the plate 70 is positioned on the vertical risers 60 at its lowermost position, i.e. near the platform 10, then the second end of the second tube 120 would be proximal to the bottom end of the container or the ground, as illustrated in FIG. 3A. The second tube 120 is, thereby, adapted to extend the entire height of the container such that the second end of the second tube 120 may be placed at any position along the height of the container.

Figure 10:
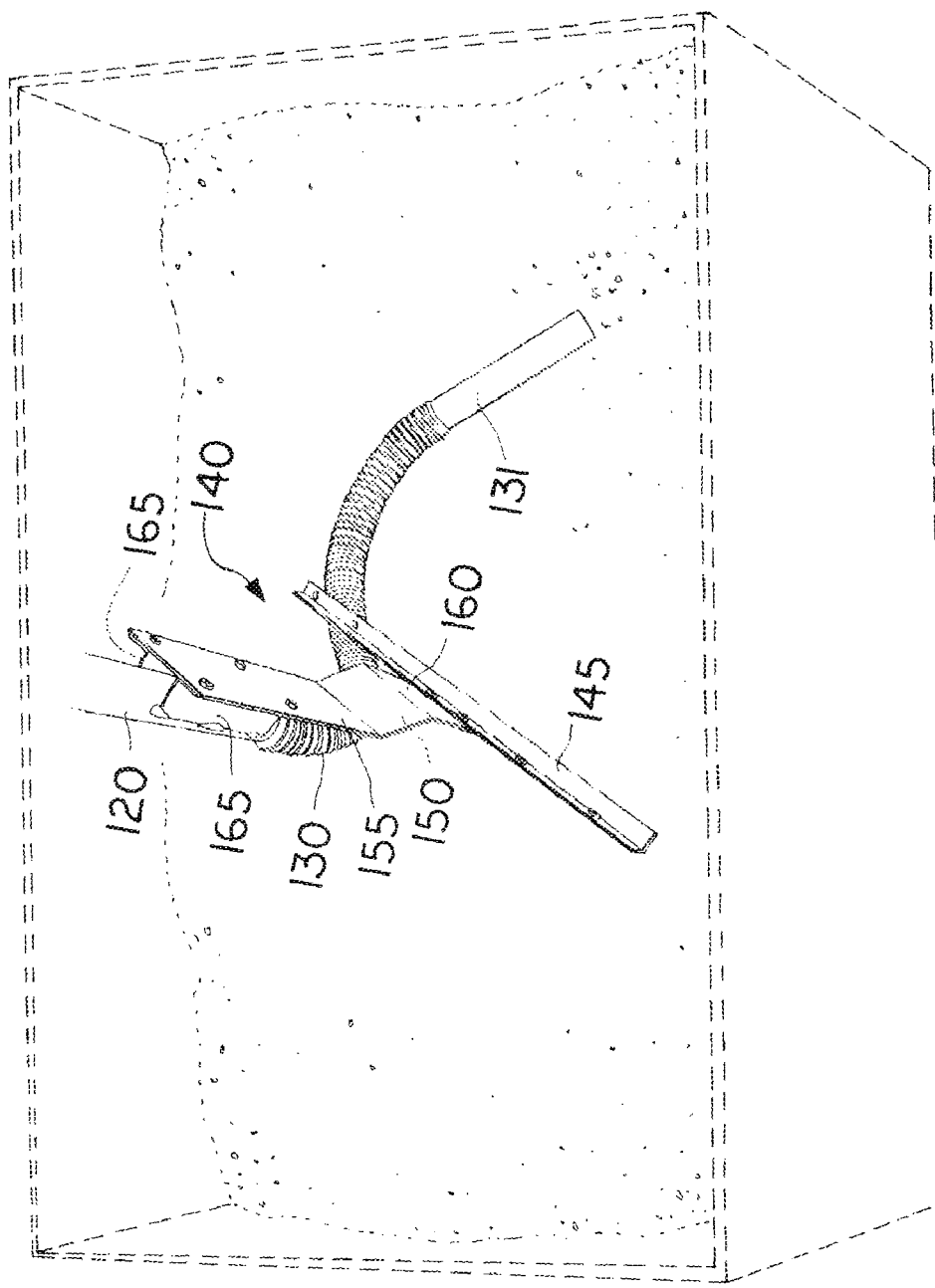
FIG. 10 illustrates an enlarged view of the sweeper assembly and flexible hose of the present invention.

Coupled to and extending from the second end of the second tube 120 is a flexible tube 130 with a rigid fitting 131 on the end. More specifically, the flexible tube 130 is concentrically fit over the second end of the second tube 120 such that a first end of the flexible tube is vertically positioned and concentric with the longitudinal axis of the first tube 95 and the second tube 120. The flexible tube is adapted to bend approximately 90 degrees so as to extend horizontally therefrom. In another embodiment of the invention, the second end of the second tube 120 is angled and the flexible tube 130 is adapted to fit over the angled portion such that a first end of the flexible tube is vertically positioned and concentric with the longitudinal axis of the second tube 120 and the flexible tube 130 extends over the bend in the second tube 120 so as to extend horizontally from the second tube. To this end, in both embodiments above and as illustrated in FIG. 10, the flexible tube is adapted to extend perpendicularly from the longitudinal axis of the first tube 95. Furthermore, in both of the above embodiments, the flexible tube is sized to extend from the second tube 120 so as to reach each side and corner of the targeted container from which the resin will be removed.

The flexible tube 130 may be coupled to the second tube 120 by way of a coupling mechanism such as a clamp, most preferably a screw clamp. However, this coupling mechanism is not limited to a clamp and may be comprised of threading engagement, snap fit, a retention ring, bolts, or any similar mechanism or frictional engagement known in the art such that the lumen of the flexible tube 130 is placed into fluid communication with the second tube 120. The flexible tube 130 in this configuration is, thereby, in fluid communication with the second tube 120, and in fluid communication with the vacuum source. The flexible tube 130 provides a smooth, flow path for air entrained particulate material, i.e. the contents of the container, such that the contents of a specific container may be suctioned or removed from the container and deposited in a secondary location. The flexible tube 130 is of a length sufficient to reach any corner and or side of a container when coupled to the second tube 120 in accordance with the above. For example, if the frame 5 straddles a specific container and the second tube is lowered into the interior of the container, the flexible tube 130 is of a sufficient length to reach each co-planar corner and side of the container. As the second tube is rotated, the flexible tube 130, thereby, extends the reach of the second tube to any co-planar point within the container.

The flexible tube 130 may be comprised of a polymeric or co-polymeric substance adapted to withstand the negative pressure generated by the vacuum source and the sheer forces associated with the rotation of the flexible tube 130 about the container. In one embodiment, the flexible tube may be comprised of a synthetic polymer, e.g. vinyl. The synthetic polymer may be cured such that the flexible tube 130 is contains one or more ridges arranged about the periphery of the flexible tube 130. The ridges may be arranged concentrically about the diameter of the flexible tube such that each ridge is substantially perpendicular to the longitudinal axis of the flexible tube 130. Alternatively, in a more preferred embodiment, the ridges extend at an angle, with respect to the longitudinal axis of the tube, such that the ridges form a spiral design about the periphery of the flexible tube 130. In an even further alternative embodiment, the ridges may be reinforced with steel or metallic wiring so as to maintain the opening of the lumen of the flexible tube 130 during the use of the vacuum source.

At an end of the flexible tube 130 distal to the second tube 120 is a rigid fitting 131. As illustrated in FIG. 10, the rigid fitting 131 is cylindrical in shape and may be comprised of a light-weight material such as, but not limited to, aluminum, plastic, etc. The rigid fitting 131 is of a relatively uniform diameter and is adapted to be received within the flexible tubing 130. The rigid fitting 131 may be secured to the end of the flexible tube 130 by any means understood in the art. For example, this rigid fitting 131 may be secured within the flexible tubing 130 by a clamp, strap, or other frictional means. Alternatively, the rigid fitting 131 may be bonded or glued within the flexible tubing 130 by any bonding agent, e.g. epoxy, known in the art.

Figure 4:
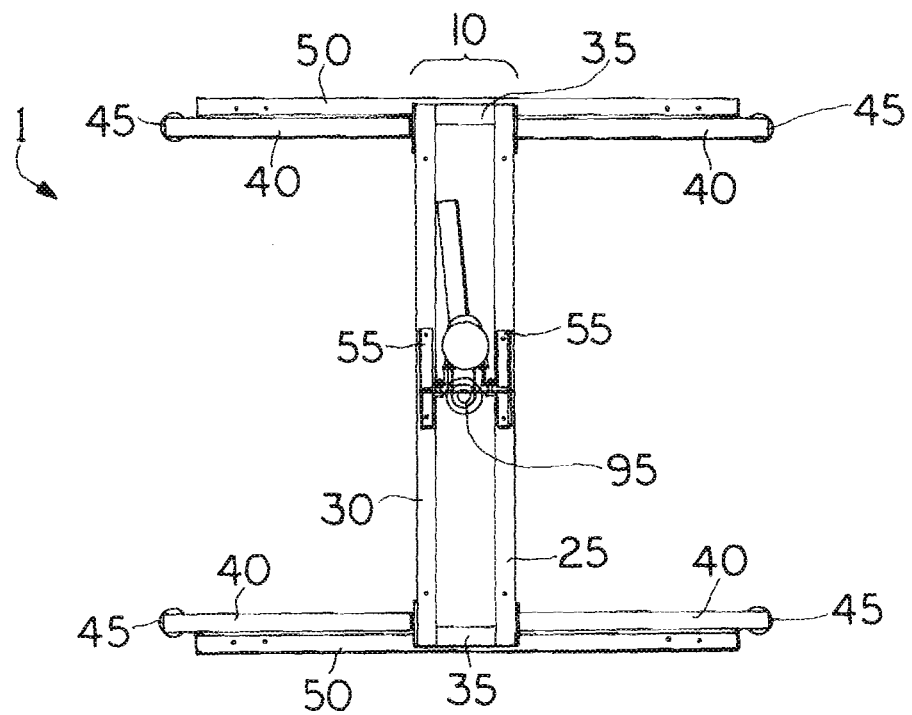
FIG. 4 illustrates a top view of the vacuum loader assembly of the present invention.

As noted above, the second tube 120 and the flexible tube 130 are both rotatable about the longitudinal axis of the second tube 120 and may be rotated by a motor 135. More specifically, referring to FIGS. 3A and 3B, the motor 135 is coupled to the plate 70 at approximately the junction of the first tube 95 and the second tube 120. The motor 135 may be mounted to the plate 70 on a side of the plate opposing the first tube 95 or in any other location of the plate such that the motor does not interfere with the junction of the first tube 95 and second tube 120 and/or interfere with the rotation of the second tube 120. The motor 135 may be mounted to the plate 70 by a plurality of bolts and nuts or any other similar securing mechanism known in the art. To this end, the motor 135 is preferably secured to the plate by way of a casing wherein the casing is directly or indirectly coupled to the plate so as not to interfere with the action of the motor 135. As illustrated in FIGS. 4 and 5, the motor of the present invention may be secured to the plate by way of a casing wherein the casing is circular in shape and contains a plurality of brackets, which may be coupled to the plate. However, the present invention is not limited to the casing illustrated in these figures and may include any similar apparatus or structure known in the art for coupling a motor to a frame.

Figure 7:
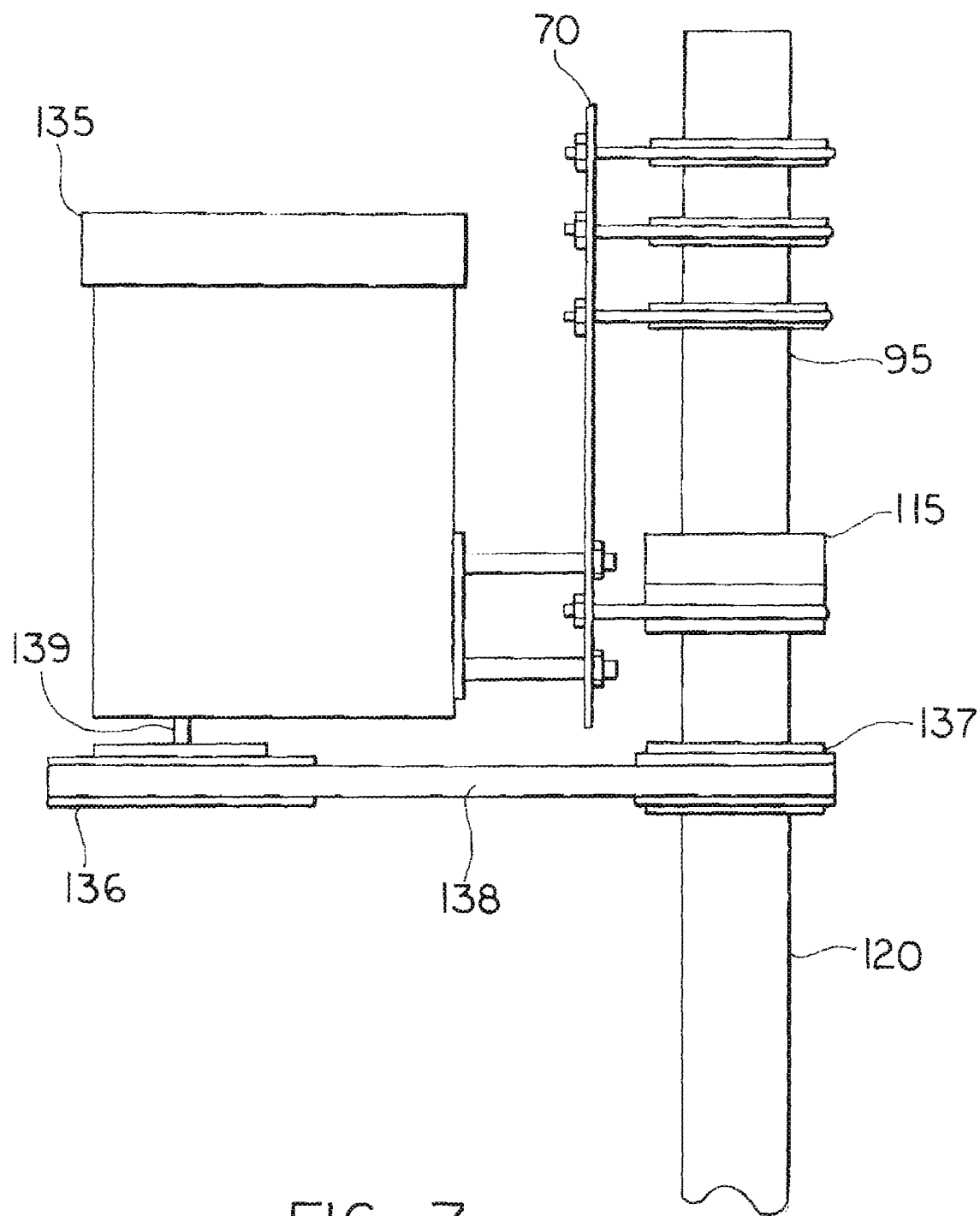
FIG. 7 illustrates a schematic view with the frame removed so as to illustrate the connection between the motor and the vacuum tube with the plate.

Referring to FIG. 7, the motor 135 is adapted to facilitate the rotation the second tube about its longitudinal axis by way of a pulley assembly. More specifically, a rotatable shaft 139 extends from the motor 135 and the motor casing such that one end of the shaft 139 is exposed. The shaft 139 may be rotated by the action of the motor such that it may rotate in either a clockwise or counterclockwise direction. Coupled to the exposed end of the shaft 139, is a first, annular pulley wheel 136. The first pulley wheel 136 is secured to the shaft 139 such that the pulley wheel 136 rotates in unison with the shaft 139 and may be fixedly coupled to the shaft or removably coupled thereto. In one embodiment, the first pulley wheel 136 is coupled to the shaft 139 such that the pulley wheel 136 is substantially beneath the plate 70. An annular groove or recess (not illustrated), may extend about the periphery of the first pulley wheel 136 wherein the annular groove or recess receives a rope, belt, wire, or similar known mechanism in accordance with the below.

Coplanar with the first pulley wheel 136 and coupled to the second tube 120 is a second, annular, pulley wheel 137. The second pulley wheel 137 is secured to the second tube 120 such that the second pulley wheel 137 rotates in unison with the second tube 120 and may be fixedly coupled to the second tube 120 or removably coupled thereto. In one embodiment, the second pulley wheel 137 is coupled to the second tube 120 such that the pulley wheel 137 is substantially beneath the plate 70. An annular groove or recess (not illustrated), may extend about the periphery of the second pulley wheel 137 wherein the annular groove or recess receives a rope, belt, wire, or similar known mechanism in accordance with the below.

As illustrated in FIG. 7, the first pulley wheel 136 and the second pulley wheel 137 are adapted to rotate in unison by way of a belt, rope, wire etc 138. More specifically, the belt, rope, wire, etc. 138 is received within the annular grooves of both pulley wheels 136, 137 such that the motion of one wheel is transferred to the other wheel. To this end, the rotation of the shaft 139, caused by the motor, rotates the first pulley wheel 136. This rotation is transferred to the second pulley wheel 137, by way of the belt, rope, etc. 138, and, thereby, causes the second tube 120 to rotate.

Based on the foregoing, the motor 135 may be comprised of any small, motor known in the art to rotate a shaft in accordance with the above. In one embodiment, the motor of the present invention may be comprised of an AC Gearmotor with 1/10 hp that operates the rotate the second tube and flexible tube at approximately 1 RPM. However, the present invention is not limited to a motor of these specifications and may be comprised of a similar motor that is fairly lightweight, such that the weight of the motor does not hinder the function of the method and apparatus disclosed herein, and that turns the second tube and the flexible tube at a sufficient rate to adequately suction the contents of the container.

In operation, the vacuum loader assembly 1 of the present invention is placed on a, preferably, flat surface, such as a manufacturing or warehouse floor. The plate 70 is lifted along the vertical risers 60 of the extension assembly 20, by way of pulley system and the wheels 75 and track assembly, such that the plate is proximal to its uppermost position, i.e. proximal to the horizontal rail 65. This, in turn, raises the first tube 65, second tube 120, and the flexible tube 130 to a point where a container may be positioned beneath the frame base 10 and between each of the four legs 40. The container may be positioned beneath the base 10 by a forklift, a conveyer belt, a rail system, or any other manual or automatic means known in the art for moving a storage load. Once the container is in position and the top of the container is open, the plate 70 is lowered, again by way of the pulley and track/wheel systems, such that the flexible tube 130 and the second tube 120 are lowered into the container. Preferably, the plate is lowered until the flexible tube contacts the contents of the container wherein, due to the rigidity of the second tube and first tube, the plate 70 is, thereby, held in position above the base 10 and along the extension assembly 20. The counterforce, preferably provided by the constant force spring, provides a counterweight to the plate, motor, and tubes. This counterforce functions to reduce the downward force provided by these items on the resin. Accordingly, the counterforce causes the flexible tube to remain on top of the resin and prevents the weight of the plate, motor and tubes from causing the flexible tube to dig into the resin. The counterforce is of such a magnitude that the flexible tube remains on the top of the pile and is lowered as the resin is consumed. In a preferred embodiment, this downward force exerted by the plate, motor, and tubes is reduced by the counterforce to approximately 3 lbs. The present invention, however, is not limited to this embodiment and the second tube and flexible tube may be forced beneath the surface of the contents of the container, such as to the bottom of the container, manually, by way of the weight of the motor, plate and tubes or by way of the pulley system.

Once the flexible tube 130 is in the preferred starting position, an operator may then activate the motor 135 and the vacuum source. Alternatively, and preferably, the vacuum created by the activation of the vacuum source closes a switch, which automatically activates the motor. The motor then causes the first pulley wheel 136 to rotate. The motion is transferred to the second tube 120 and flexible tube 130 by way of the second pulley wheel 137 and the belt, wire, rope, etc. 138. While the flexible tube 130 and second tube 120 are rotating, a suction force is exerted through the flexible tube 130 by way of the vacuum source and the rigid fitting 131 facilitates applying the suction force to the resin. To this extent, the flexible tube 130 suctions and removes the material resin within the container as it rotates. The suctioned resin or particulate material, thereby, travels from the container through the flexible tube, 130, second tube 120, and first tube 95, ultimately, to piping or tubing, or other similar means often used in conveying lines, or to wherever it the particulate matter is needed for manufacturing purposes.

In one embodiment, the vacuum loader assembly 1 of the present invention removes the material resin from the top down wherein, as the material from the top of the container is removed, the plate 70, by way of pulley and the wheel and tracks, and counterforce is lowered along the extension assembly 20 and the flexible tube 130 is further lowered into the interior of the container. In other words, the plate and tubes are further lowered into the container as resin is evacuated until, eventually, the flexible tube 130 reaches the bottom of the container and removes the last of the material resin.

Based on the foregoing, the present apparatus is advantageous because it is able to cover the entire area of the container without an operator's intervention. More specifically, once the flexible tube and second tube is lowered into the container and the motor and vacuum source are activated, the apparatus of the present invention is able to suction substantially the entire contents of the container due to the rotation of the second tube and the flexible tube. This action is performed without the aid of an operator or employee to continuously check the vacuum loader and ensure that it is operating correctly. Moreover, because of the length and bendability of the flexible tubing, the present invention is capable to suctioning substantially the entire area of the container, thereby, removing substantially all of the contents contained therein. To this extent, the present invention reduces costs of labor for removing the content of the container and boosts overall productivity.

Figure 6:
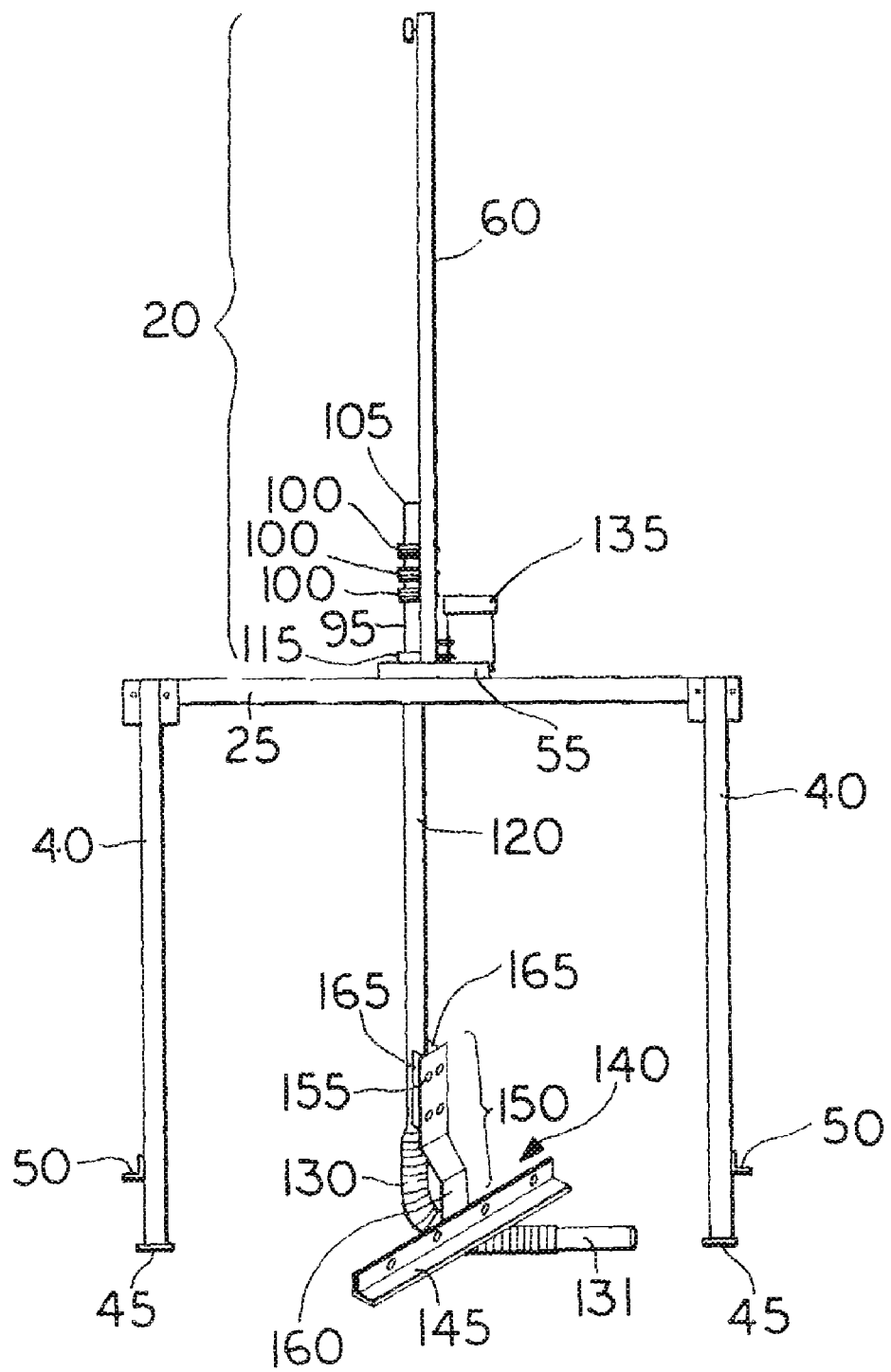
FIG. 6 illustrates an alternative embodiment of the vacuum loader assembly including a sweeper assembly coupled to and extending from the flexible tube.

Referring to FIGS. 6 and 10, in an alternative embodiment, the present invention may further include a sweeping assembly 140. More specifically, the sweeping assembly 140 is comprised of a sweeping element 145 and coupling mechanism 150. The sweeping element 145 may be comprised of a solid material, e.g. metal, plastic, wood, or the like, thereby forming a blade-like apparatus. In a preferred embodiment, the sweeping element is an angled blade-like apparatus such as an L-bracket, or similarly angled arrangement.

The sweeping element 145 is coupled to one end of a coupling mechanism 150. Specifically, the coupling mechanism is comprised of a flat plate 155 and a plurality of holes therein adapted for use to secure the plate 155 to the second tube. At one end, a portion of the plate is raised 160 such that the raised portion is parallel to the plate 155. Extending in both directions from the raised portion 160 is an extension wherein the extension is adapted to receive the sweeping element 145. The coupling mechanism 150 may be comprised of a solid, preferably rigid, material, e.g. metal, plastic, wood, or the like, and may be the same material as the sweeping element 145.

The sweeping element 145 is secured to the extension of the raised portion 160 by any securing mechanism known in the art. In one embodiment, as illustrated in FIG. 10, the sweeping element 145 is bolted to the extension of the raised portion 160 such that the sweeping element 145 is secured thereon. The present invention, however, is not structurally limited to this configuration and the sweeping element may be welded, glued, bonded, or secured to the extension of the raised portion 160 by any similar means known in the art.

As noted above, the flat plate 155 is adapted to be secured to the second tube by a plurality of holes therein. More specifically, these holes may be sized to receive a plurality of bolts or screws that secure the flat plate and, ultimately, the entire sweeping assembly 140 directly to the second tube. In a more preferred embodiment, however, the holes align with similarly spaced holes on one end of one or more, preferably metallic, L-brackets 165. These L-brackets are, thereby, coupled to the flat plate 155 by way of a plurality of bolts and nuts, although the present invention is not limited to this method of coupling the flat plate 155 to the L-brackets 165. The opposing ends of the L-brackets 165 are adapted to be secured to opposing sides of the second tube 120 wherein each L-bracket 165 is coupled to its respective side of the second tube 120 and to the flat plate 155. In a preferred embodiment, each L-bracket 165 may be welded, i.e. spot welded, to the side of the second tube; however, the present invention is not limited to these methods and, in accordance with the above, any method of securing a metal L-bracket to a metal tube may be utilized.

The sweeping assembly 140 is coupled to the second tube 120 such that the flat plate 155 and raised portion 160 extend toward the flexible tube 130. More specifically, it is preferred that the sweeping assembly 140 extend from the second tube such that the extension and sweeping element 145 can contact the bulk resin within a container and be substantially co-planar with the flexible tubing but without inhibiting the ability of the flexible tubing to reach the outer walls of the container. In this configuration, the sweeping assembly 140 is rotatable in concert with the second tube 120 and the flexible tube 130.

In operation, the sweeping assembly 140 functions to move particulate matter from the center of the container to the periphery of the container. More specifically, as the motor causes the second tube 120 and flexible tube 130 to rotate, in accordance with the above, the sweeping assembly 140 rotates about the vertical axis of the second tube 120. In doing so, the sweeping element urges the particulate matter away from the center of the container and toward the periphery of the container. This action is advantageous because it forces the particulate matter within the container toward the rigid end 131 of the flexible tubing 130, thereby, facilitating the ability of the flexible tube 130 to remove the particulate matter from the container. Thus, a greater percentage of the particulate matter may be removed from the container without operator or employee intervention.

In accordance with the foregoing, it is particularly preferred that the sweeping element 145 be substantially angled, such as L-bracket, such that the concave portion of the sweeping element 145 receive the bulk resin as the sweeper assembly 140 rotates. In this configuration, the sweeping element 145 is adapted to redirect the particulate matter by way of the channel create therein. Thus, an even greater percentage of the bulk resin may be redirected toward the periphery of the container where it may be evacuated by the rigid end 131 of the flexible tube 130.

I claim:

1. Apparatus for unloading a resin from a container having a rectangular horizontal cross section and planar interior bottom with right angle corners bounding the container interior, comprising:
    (a) a frame comprising a base held above the ground by a plurality of legs and an extension assembly extending perpendicularly from the base, the base having a front rail, a rear rail and two side rails wherein the front rail and the rear rail are coupled to the side rails so as to form a substantially rectangular platform with an opening passing therethrough, with the extension assembly including a first vertical riser, a second vertical riser, and a horizontal rail wherein a first end of the horizontal rail is coupled to a first end of the first vertical riser and a second end of the horizontal rail is coupled to a first end of the second vertical riser and a second end of the first vertical riser is coupled to the front rail of the base and a second end of the second vertical riser is coupled to the rear rail of the base such that the extension assembly straddles the opening of the base, with a plate slidably mounted to the extension assembly for vertical movement along the extension assembly, with the frame being sized to fit over an opening of a container;
    (b) a first tube coupled to the plate such that the first tube is perpendicular to the base, wherein the first tube is adapted to be placed in fluid communication with a vacuum source via physical connection therewith;
    (c) a second tube in fluid communication with the first tube, extending co-axially with the first tube and downwardly from and perpendicular to the base, the second tube being rotatably and co-axially connected to the first tube to extend into the opening of a container over which the frame has been placed, wherein the second tube is elbowed at an end of the tube distal to the first tube;
    (d) a flexible tube coaxially connected to and in fluid communication with the second tube at an end of the second tube remote from connection of the second tube with the first tube, the flexible tube having at least a portion running along the planar interior bottom; and
    (e) a motor mounted on the plate for vertical movement with the plate along the risers of the extension assembly, being coupled to the second tube such that the motor rotates the second tube and the flexible tube; and
    (f) a sweeper assembly coupled to the second tube, comprised of a sweeping element and a coupling mechanism wherein the coupling mechanism is coupled to the second tube such that the coupling mechanism extends downward from the second tube and toward the flexible tube, with the sweeping element of the sweeper assembly being angled and the sweeping element of the sweeper assembly comprises an L-bracket, with the sweeping element extending parallel with and running along the bottom of the rectangular container interior, positioned at an angle relative to the axis of the rotation of the second tube, for urging resin material towards the interior rectangular periphery of the container including the right angle corners thereof as the sweeper assembly rotates with the second tube, for resin collection by suction at an open end fitting of the flexible tube.

2. The apparatus of claim 1 wherein the container is a Gaylord.

3. Apparatus for unloading bulk resin from a container having a planar bottom and sides that meet to form right angle corners defining the periphery of the container interior, comprising:
    (a) a frame sized to fit over an opening of container;
    (b) a motor connected to the frame and movable vertically therealong;
    (c) a tubular member mounted on the frame and moveable vertically with the motor therealong, the tubular member comprising a rotatable portion and a stationary portion, the rotatable portion of the member being coupled to the motor output for rotation of the member by the motor, the stationary portion of the member having a first end proximate the motor and being connectable to a vacuum source so as to have vacuum drawn through the tubular member, the rotatable and stationary portions of the member being coupled for fluid communication therebetween, the rotatable portion of the member extending vertically downwardly into the opening of a container over which the frame has been placed, having an elbow part below the motor and a flexible portion with a fitting on one end defining a second end of the tubular member, at least a part of the flexible portion contactingly running along the bottom of the container as the rotatable portion of the tubular member rotates, with the end fitting defining the second end of the tubular member drawing in resin, when vacuum is drawn by the vacuum source, as part of the flexible member runs along the planar bottom of the container proximate the container interior periphery including the right angle corners thereof; and
    (d) a sweeper blade attached to a rigid part of the tubular member adjacent to and adjoining the flexible part, the blade being transverse to the rigid part of the tubular member and rotating therewith as the motor turns the rotatable portion of the member the blade extending along the bottom surface of the container in perpendicular relation to the axis of rotation of the rotatable portion of the tubular member to sweep resin material away from the axis of rotation of the rotatable portion of the tubular member along the planar bottom towards the periphery of the container interior including right angle corners thereof.

4. A method for unloading bulk resin from a container having a planar bottom and sides that meet to form right angle corners defining the periphery of the container interior, comprising:

(a) positioning a frame sized to fit over an opening of the container on the container;
(b) connecting a motor to the frame in a manner to be movable vertically therealong;
(c) mounting a tubular member on the frame in a manner to be moveable vertically with the motor therealong, coupling a rotatable portion of the member to the motor output for rotation of the member by the motor, with a stationary portion of the member having a first end proximate the motor and being connectable to a vacuum source so as to have vacuum drawn through the tubular member, the rotatable and stationary portions of the member being coupled for fluid communication therebetween, the rotatable portion of the member extending vertically downwardly into the opening of the container over which the frame has been placed, having an elbow part below the motor and a flexible part terminating in a fitting at a second end of the tubular member with a sweeper blade attached to a rigid part of the tubular member adjacent to and adjoining the flexible part, the blade being transverse to the rigid part of the tubular member and rotating therewith to sweep resin material along the bottom of the container as the motor turns the rotatable portion of the member;
(d) drawing vacuum in the tubular member using the vacuum source; and
(e) energizing the motor thereby rotating the rotatable portion of the tubular member through resin in the container, drawing the resin into the second end of the tubular member and rotatably angularly sweeping remaining resin around the bottom of the container away from the axis of rotation of the rotatable portion of the member toward the interior periphery of the container including the right angle corners to encounter the second end of the tubular member and be drawn thereinto;
(f) vertically moving the motor and the tubular member along the frame as needed to maintain fluid communication and contact of the sweeper blade and the second end of the tubular member as the container empties of resin.

\* \* \* \* \*

UNITED STATES PATENT AND TRADEMARK OFFICE
CERTIFICATE OF CORRECTION

PATENT NO. : 8,104,997 B2  
APPLICATION NO. : 12/102454  
DATED : January 31, 2012  
INVENTOR(S) : Stephen B. Maguire Page 1 of 1

It is certified that error appears in the above-identified patent and that said Letters Patent is hereby corrected as shown below:

Title Page

Please add the following patent under (56) References cited:

6,317,919 B1    12/2004    Broderick

Signed and Sealed this  
Thirtieth Day of October, 2012

David J. Kappos  
*Director of the United States Patent and Trademark Office*